Oct. 3, 1967  W. V. DE FOREST  3,344,850
THERMOSTATIC CONTROL DEVICE
Filed Feb. 24, 1965  3 Sheets-Sheet 1

INVENTOR
WESLEY VERNE DeFOREST

BY *Anthony A. O'Brien*
ATTORNEY

INVENTOR
WESLEY VERNE DeFOREST

BY Anthony H. O'Brien
ATTORNEY

United States Patent Office 3,344,850
Patented Oct. 3, 1967

3,344,850
THERMOSTATIC CONTROL DEVICE
Wesley Verne De Forest, Long Beach, Calif., assignor to Robertshaw Controls Company, Richmond, Va., a corporation of Delaware
Filed Feb. 24, 1965, Ser. No. 434,789
13 Claims. (Cl. 165—26)

This invention relates to thermostatic control devices and, more particularly, to a thermostatic control device combined with a Hall effect device.

Conventional thermostatic control devices include temperature sensing means that are movable to make and/or break a switch that controls the circuit for a heating and/or cooling system.

For example, a spiral bimetal element coils and uncoils in response to temperature variations and the free end of the bimetal is adapted to operate the switching contacts in the system's control circuit. Such known prior art devices are confronted with numerous disadvantages, e.g., dust collection on the contacts, additional circuit components for modulation control, and complex circuits for controlling both heating and cooling systems.

It is, therefore, an object of the present invention to construct a thermostatic control device from relatively few parts having a relatively simple principle of operation.

Another object of this invention is to combine a Hall effect device with the temperature sensing means of a thermostatic control device.

The present invention has another object in that the output signal of a Hall effect device is varied in accordance with temperature variations.

It is another object of this invention to mount a Hall effect device on a thermally responsive bimetal.

Another object of the present invention is to move a Hall plate in its magnetic field in accordance with variations in temperature sensed by thermostatic means.

Another object of the present invention is to establish a null position in a magnetic field for a Hall effect device.

The present invention has another object in that a Hall effect plate is disposed in a null magnetic field position between the like facing poles of a pair of spaced magnets.

The present invention has another object in that a heating and/or cooling system control circuit receives a modulating control signal from a Hall effect device corresponding to the varying demand of the system.

Another object of the present invention is to provide a heating and/or cooling system control device with simple means for selection between a modulating control function and an on-off control function.

A further object of this invention is to provide a thermostatic control device with automatic switch over from one system to another in a heating and cooling system.

In practicing the present invention, a thermostatic control device having temperature sensing means is provided with magnetic means to define a magnetic field, Hall effect means is disposed in the magnetic field and includes input and output means, and an operative connection is made between the Hall effect means and the temperature sensing means whereby the Hall effect means is movable in the magnetic field to vary its output signal in accordance with temperature variations.

Other objects and advantages of the present invention will become apparent from the following description taken in connection with the accompanying drawings wherein.

Figure 1:
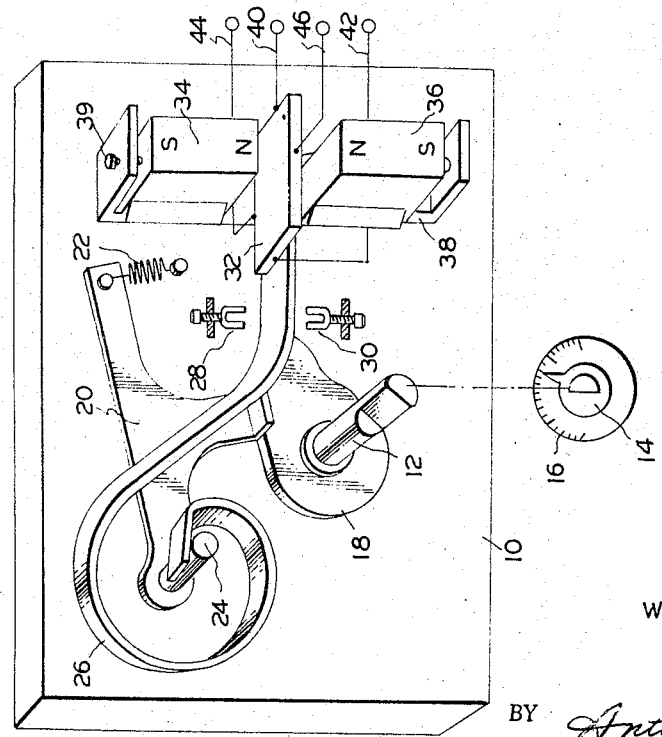
FIGURE 1 is a perspective view of a thermostatic control device embodying the present invention.

While the present invention may be incorporated in a wide variety of temperature responsive devices, it will be described as applied to a thermostatic device for controlling heating and/or cooling systems. Accordingly, as is illustrated in FIGURE 1, such a control device includes a mounting base 10 adapted to be attached to a support such as a wall in the space to be temperature controlled. One end of a temperature setting shaft 12 is rotatably carried by the base 10 and its opposite end has a D-shaped cross section on which a knob or dial pointer 14 is fixed; a scale disc 16 is non-rotatably mounted on the shaft 12 or is otherwise suitably fixed to the base 10 so as to be in cooperative relation to the pointer 14. The scale disc 16 is provided with suitable indicia corresponding to the degrees of temperature; e.g., in a room thermostat, the mid-point of the scale represents 70° F. and the opposite ends thereof, respectively represent 50° F. and 90° F. A thermometer (not shown) may be disposed on the lower side of the disc 16.

A cam plate 18 is fixed to the shaft 12 for rotation therewith and engages a lever plate that defines a cam follower 20 to move the same in response to rotation of the dial pointer 14. One end of the follower 20 is attached to a tension coil spring 22 and its other end is pivotally carried by the base 10 whereby the follower 20 is normally biased in a clockwise direction about its pivoted end, as viewed in FIGURE 1, so as to be in continuous engagement with the cam plate 18. Adjacent its pivoted end, the follower 20 carries a stud 24 to which a temperature responsive element is affixed; the temperature responsive element comprises a spiral bimetal 26 having an inner end secured to the stud 24 as by welding so that its outer or free end moves up and down, as viewed in FIGURE 1, in response to temperature variations.

With such an arrangement, the free end of the bimetal 26 is provided with a modulating movement in response to temperature variations; however, a snap mechanism such as an overcenter spring device or a magnet device may be utilized to increase the temperature differential and secure a more positive response for on-off operation without modulation. Such a snap mechanism in FIGURE 1 comprises upper and lower permanent magnet assemblies 28 and 30, respectively, which are adjustably carried by wall portions of the base 10. The magnet assemblies 28 and 34 are disposed on opposite sides of the bimetal 26 adjacent the movable end thereof.

A Hall plate 32 is fixed to the movable end of the bimetal 26 for movement therewith and is disposed between the pole faces of a pair of spaced permanent magnets 34 and 36 that are secured to the base 10 by means of an elongated U-shaped bracket 38. A screw 39 is threaded through one leg of the bracket 38 and engages the upper magnet 34 to define a magnet adjustment means for selectively varying the space between the magnets 34 and 36; such adjustment permits the operating differentials and the heating-cooling operating range to be adjusted. The magnets 34 and 36 are mounted with their north poles toward each other with the Hall plate 32 disposed therebetween; the plane of the Hall plate 32 is approximately parallel to the pole faces of the two magnets. A pair of opposite edges of the Hall plate 32 are electrically connected to input current leads 40 and 42, and another pair of opposite edges are electrically connected to output voltage leads 44 and 46.

The Hall plate 32 is a semiconductor wafer which when placed in a magnetic field generates a voltage at the edges in a direction depending on the field and current directions and in a magnitude proportional to the product of the magnetic field strength and the intensity of the current through the plate 32. The well known Hall effect is briefly characterized in that upon passing a predetermined electrical current lengthwise through a conductive plate, which is influenced by a magnetic field passing through the plate at right angles, there occurs an output signal voltage across the plate transverse to the direction of the impressed current flow.

In accordance with the present invention the input current is maintained constant and the variation in the output signal voltage is accomplished by varying the position of the Hall plate in the magnetic field in response to a demand function such as a heating demand or a cooling demand. Thus, the Hall plate movement in the magnetic field is utilized to increase or decrease the output signal from the Hall plate.

Figure 2:
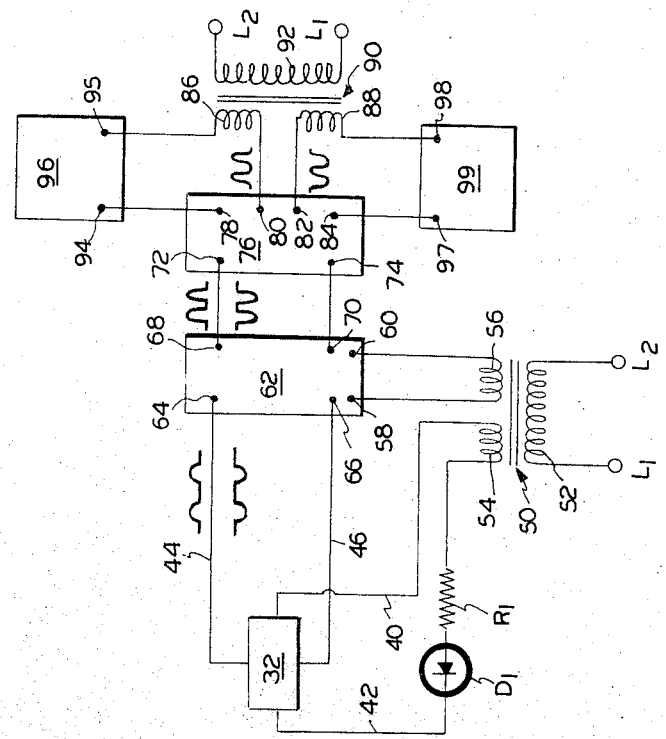
FIGURE 2 is a schematic block diagram of the control circuit for the control device of FIGURE 1.

The block diagram in FIGURE 2 illustrates the control circuit for operation of a heating and cooling system. The power supply station includes a transformer 50 having a primary coil 52 connected to power leads $L_1$ and $L_2$ which are lead terminals for input voltage, such as a 120 volt source. The transformer 50 includes two secondary coils, one coil 54 being connected to the Hall plate input leads 40 and 42 and the other coil 56 being connected to power supply leads 58 and 60 of an amplifier 62.

A diode $D_1$ and resistor $R_1$ are serially connected in lead 42 so that the position of the Hall plate 32 relative to the magnetic field determines the wave form as shown on the output lead 44. The Hall plate output leads 44 and 46 are connected to amplifier 62 and the amplified output leads 68 and 70 are connected to the switching circuit device 76. The switching circuit device includes a pair of heating control output leads 78 and 80 and a pair of cooling control output leads 82 and 84. The control output leads 80 and 82 are separately connected to the secondary coils 86 and 88, respectively, of a transformer 90 that has a primary coil 92 connected to the 120 volt source leads $L_1$ and $L_2$. The heating control output lead 78 and the other side of secondary coil 86 are connected to the leads 94 and 95, respectively, of a heating control device 96; the cooling control output lead 84 and the other side of the secondary coil 88 are connected to the leads 97 and 98, respectively, of a cooling control device 99.

Figures 3, 4:
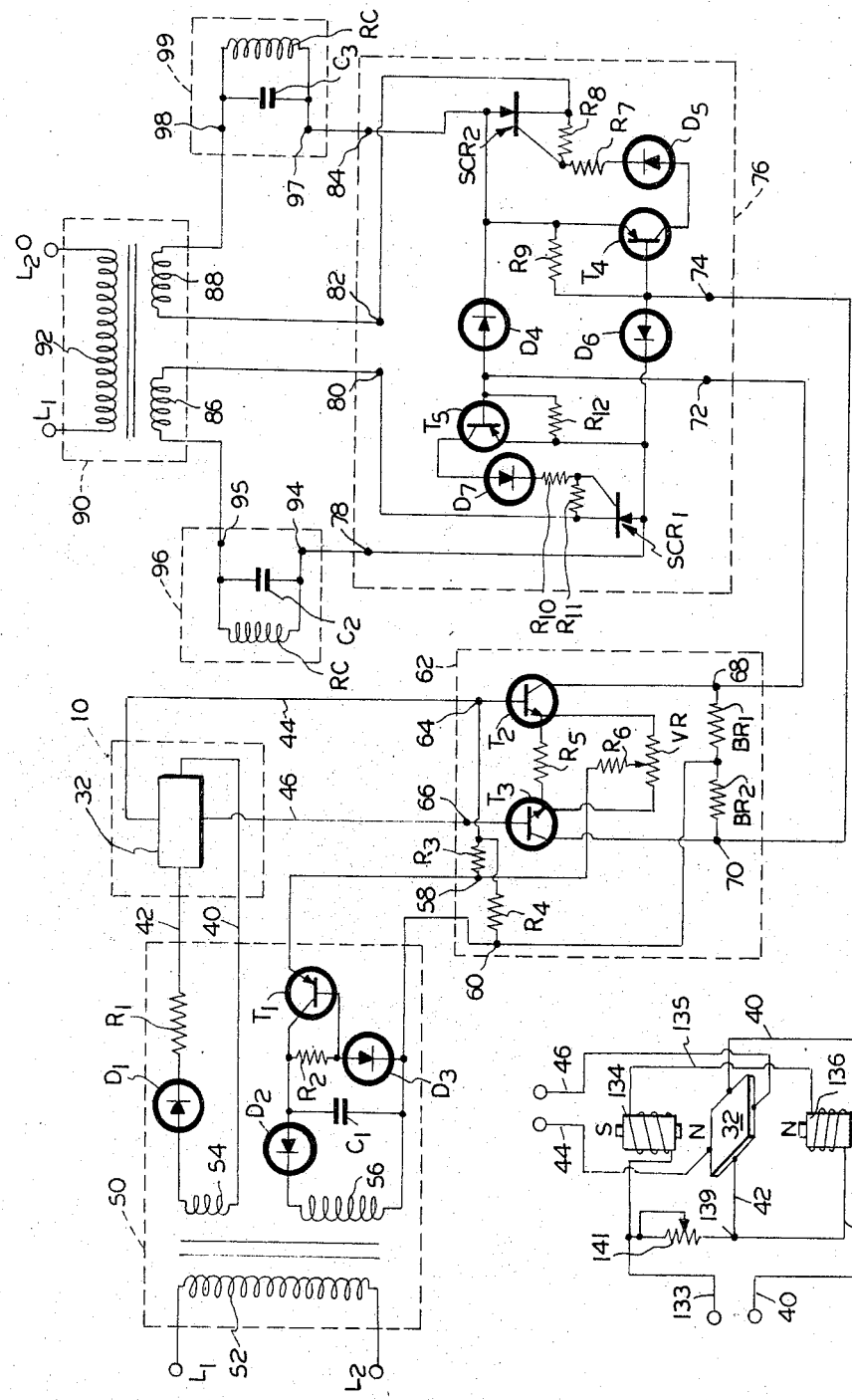
FIGURE 3 is a diagram of the electrical circuitry for the components illustrated in FIGURE 2.
FIGURE 4 is a schematic diagram of a modified form of the control device of FIGURE 1.

It is to be understood that the specific circuitry for the block components illustrated in FIGURE 2 may conform to known components. However, for the sake of completeness in disclosing an operative device, a specific example of the entire circuitry is illustrated in FIGURE 3.

The power supply transformer 50 includes a diode $D_1$ and a resistance $R_1$ connected in series with the secondary coil 54 and the lead line 42 whereby half wave current is supplied to the Hall plate 32. The transformer 50 also furnishes a regulated power supply to the amplifier 62. To this extent, a diode $D_2$ is connected in series with the secondary coil 56 in the lead line 58; a capacitor $C_1$ is connected in parallel with the diode $D_2$ and the secondary coil 56, and across the lead lines 58 and 60; a serially connected resistance $R_2$ and a Zener diode $D_3$ are connected in parallel with the capacitor $C_1$, the diode $D_2$ and the secondary coil 56, and across the lead lines 58 and 60; and a transistor $T_1$ having its emitter connected to lead line 58, its collector connected to the junction of resistance $R_2$ at lead line 58 and its base connected to a common tap between resistance $R_2$ and the diode $D_3$.

The amplifier 62 is powered by the power input leads 58 and 60; a branch circuit from lead 58 is connected to a resistance $R_3$ which is connected to the signal input lead 64 and a branch circuit from lead 60 is connected to a resistance $R_4$ which is connected to a junction between the resistance $R_3$ and the signal input lead 64. The signal input leads 64 and 66 are connected to the bases of transistors $T_2$ and $T_3$, respectively, the collectors of which are connected to the signal output leads 68 and 70, respectively. The emitters of transistors $T_2$ and $T_3$ are connected together with a resistance $R_5$ therebetween and a variable resistance VR is connected to the two emitters and in parallel to the resistance $R_5$. A second branch circuit from power input lead 58 is connected to a resistance $R_6$ which is connected to the tap of the variable resistance VR. A second branch circuit from the power input lead 60 is connected to a common junction line extending between the signal output leads 68 and 70 with a branch resistor $BR_1$ in the lead 68 side and a branch resistor $BR_2$ in the lead 70 side of such common junction line.

In the switching circuit device 76, the input lead 72 is connected to a diode $D_4$ which in turn is connected to the control output lead 84; from the diode $D_4$ a first parallel circuit includes a transistor $T_4$, a diode $D_5$, a resistance $R_7$ and a second resistance $R_8$ that is connected to control output lead 82. A second parallel circuit from diode $D_4$ includes a silicon controlled rectifier $SCR_2$ having an anode connected to a common junction in the line to the control output lead 84, a gate or trigger connected to a common junction between resistances $R_7$ and $R_8$, and a cathode connected in the line from resistance $R_8$ to the control output lead 82. The emitter of transistor $T_4$ is connected in the line from the diode $D_4$, and the collector is connected to the diode $D_5$ while the base is connected to a common junction between the input lead 74 and a diode $D_6$; a resistance $R_9$ is connected between such common junction and the line leading to the emitter of transistor $T_4$.

The switching circuit device includes circuitry for the control output leads 78 and 80 as that described above for the control output leads 82 and 84. Such circuitry includes the diode $D_6$ connected to the control output lead 78 and the parallel circuits to the control output lead 80 comprising a transistor $T_5$, a diode $D_7$, resistances $R_{10}$ and $R_{11}$, and resistance $R_{12}$.

The control output leads 78 and 80 are connected across the secondary coil 86 of the transformer 90 and the lead line 78 includes the heating control device 96; the leads 94 and 95 are connected in series to the relay coil RC of device 96 and a capacitor $C_2$ is connected in parallel across the coil RC. Similarly, the control output leads 82 and 84 are connected across the secondary coil 88 of the transformer 90 and the lead line 84 includes the cooling control device 99; the leads 97 and 98 are connected in series to the relay coil RC of device 99 and a capacitor $C_3$ is connected in parallel across the coil RC.

The particular functions of the various components in the electrical circuitry will become apparent from the following description with respect to the sequence of operation of the invention. Assuming that the temperature setting dial 14 and shaft 12 are set for a controlling temperature of approximately 75° F., the bimetal 26 positions the Hall plate 32 intermediately between like poles, such as the two north poles, of the two spaced magnets 34 and 36. This intermediate area between the magnets defines a null position where the magnetic flux is equalized so that there is no output signal from the Hall plate 32. On either side of this null position, the Hall plate 32 produces an output voltage of the same form either in phase or 180° out of phase. In the particular arrangement illustrated, a call for heat is sensed by the bimetal 26 which effects an upward movement of the Hall plate 32 from the null position into the magnetic field of upper magnet 34 whereby an in phase output signal results; similarly a call for cooling causes a downward movement of the Hall plate 32 from the null position resulting in a 180° out of phase output signal. In each case, the amplitude of the output signal depends upon the amount of deflection from the null position; thus, the amplitude of the output signal increases with greater deflection because the Hall plate 32 is moving into the increasing flux density of the magnetic field.

Assuming now that the bimetal 26 is expanded or uncoiled in response to a temperature drop below the set point of 75° F., the Hall plate 32 is accordingly moved upward toward the upper magnet 34. As is illustrated in FIGURE 3, the transformer 50 supplies a half wave current across the input leads 40 and 42 and in responding to this call for heat, the Hall plate 32 produces an in phase signal at the output of the leads 44 and 46. The in phase signal is then transmitted through the signal input leads 64 and 66 to the amplifier 62. This heat demand signal is thus amplified and transmitted through the input leads 72 and 74 to the switching circuit device 76 which selects the proper pair of control output leads for the amplifier signal in accordance with the current phase of such signal. In this example, the in phase signal appears across the heating control output leads 78 and 80 to activate the circuit for the heating relay coil RC, the operating current for such coil being supplied by the secondary coil 86 of the transformer 90. The relay coil then energizes the heat supply means (not shown) which may be gas burning apparatus or electrical heating apparatus. For example, in gas burning apparatus the relay coil RC energizes an on-off valve or the RC coil may be replaced by an electromechanical valve positioner that in turn controls the flow of gas to a burner whereby the gas flow is controlled in accordance with variation of the amplified signal as produced from the modulating bimetal 26.

With the above arrangement it is possible to eliminate the usual time lag between the modulating call for heat and the operation of the heating appliance to satisfy the heat demand. By obtaining instantaneous response the chances of overshooting have been virtually eliminated so that the control device will cycle thermostatically within its set operation differentials.

While modulation is desirable for some instances, there may be other instances where on-off control is more suitable for particular installations. In such installations, the permanent magnets 28 and 30 are spaced on opposite sides of the bimetal 26 adjacent its free end. Movement of the bimetal 26 in response to a call for heat provides movement toward the heating demand permanent magnet 28 so that as the bimetal 26 comes under the influence of the magnetic flux from magnet 28, the final movement of the bimetal 26 is effected with a snap action. The Hall plate 32 is similarly moved to an on position in the magnetic field of the heat demand magnet 34 and produces an output signal of constant voltage. This constant voltage signal is transmitted through the amplifier 62 and switching circuit device 76, as explained above, and the heating relay coil RC effects energization of an on-off valve controlling the gas flow to the burner. Satisfaction of the heat demand causes the bimetal 26 to contract or coil and as soon as the bimetal force exceeds the magnetic force from the permanent magnet 28, the Hall plate 32 will return to the null position with a snap action; the absence of an output signal from the Hall plate 32 effects deenergization of the heating relay coil RC and movement of the on-off valve to its off position.

In the controlling the cooling cycle of the system, the bimetal 26 contracts or coils in response to a temperature increase above and set point 75° F. and the Hall plate 32 is accordingly moved downward toward the cooling demand magnet 36. The operation for the cooling cycle is substantially the same as that described above for both modulation and on-off control of the cooling relay coil RC in the cooling control device 99. During the cooling cycle the output voltage from the Hall plate 32 is 180° out of phase but has the same wave form as the heating cycle signal; the wave forms are illustrated in FIGURE 2, above and below the appropriate leads to represent the in phase and out of phase signals.

It is common practice to install heating and cooling systems in modern homes and building structures, and for the sake of economy and efficiency certain components of the two systems are arranged for common usage. However, in such installations, it has been necessary to provide manual switch over or complex arrangements for semi-automatic switch over between the heating system control and the cooling system control. In accordance with the present invention, a unitary thermostatic control provides fully automatic switch over between the heating and cooling systems.

A modification of the magnetic means for the Hall plate 32 is illustrated in FIGURE 4 wherein like reference numerals are used for parts identical to those described in connection with FIGURES 1-3, reference numerals with 100 added are used for similar parts that are modified, and new reference numerals are used for new parts. For example, the transformer secondary coil 54 has one lead connected to the Hall plate input lead 40 and its other lead connected through D' and R to a conductor 133 which is serially connected to the coil winding of an upper electromagnet 134. A conductor 135 provides a series connection between the coil winding of the upper electromagnet 134 and the coil winding of a lower electromagnet 136 which in turn is connected to a conductor 137 having a common junction tap 139 that is connected to the Hall plate input lead 42. A variable resistance 141 is connected between the conductor 133 and the common junction tap 139.

The sequence of operation of the arrangement shown in FIGURE 4 is substantially the same as that described above in connection with FIGURES 1-3 so that only those areas where the sequence of operation is different will be described. Accordingly, the electromagnets 134 and 136 are disposed with like poles facing each other and the winding coils thereof are connected in series with the current input leads 40 and 42 of the Hall plate 32. It is now apparent that the two electromagnets establish the magnetic field means into which the Hall plate 32 is moved from a null position by the bimetal 26. The variable resistance 141 is connected across the two windings of the electromagnets to permit adjustable variation between the magnetic field and the input current to the Hall plate 32. Thus, the variable resistance 141 defines a means for selectively controlling the sensitivity and the operating differentials of the thermostatic control device. Other arrangements of variable resistor means will permit the heating and cooling operating differentials to be controlled separately, if it is so desired for a particular installation.

The modified amplifier 62 in FIGURE 5 operates substantially the same as described above in connection with FIGURE 3, so the same reference numerals have been used for identical parts and new reference numerals for different components and only the different components will be described. For instance, a pair of magnetic reed type switches 100 and 101 have coiled windings 102 and 103, respectively, with the leads 104 and 106 for winding 102 being connected to leads 94 and 95, respectively, of FIGURE 3 and with the leads 105 and 107 for winding 103 being connected to leads 97 and 98, respectively, of FIGURE 3. Switch 100 has a contact terminal 108 connected to the conductor extending between the emitter of transistor $T_2$ and one end of the variable resistance VR; similarly, switch 102 has a contact terminal 109 connected to the conductor extending between the emitter of transistor $T_3$ and the other end of the variable resistance VR. The switches 100 and 101 also have contact terminals 110 and 111, respectively, which are connected together to a common junction 112 in the conductor extending from the resistance $R_6$ to the tap of the variable resistance VR.

Figure 5:
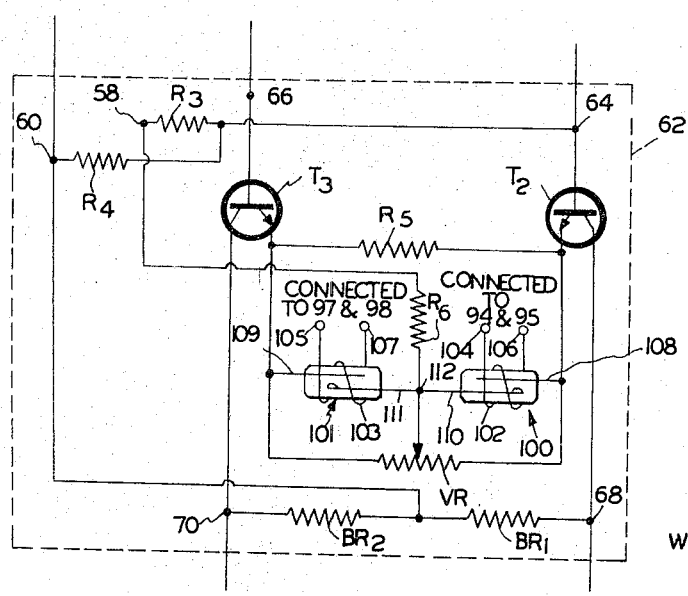
FIGURE 5 is a diagram of the electrical ciruitry of a modified amplifier.

With the arrangement of FIGURE 5, the magnetic reed switch circuits receive a feedback signal from their corresponding relay coils RC when the firing point is reached on their respective silicon controlled rectifiers SCR₁ and SCR₂. For example, firing of the silicon controlled rectifier SCR₁ energizes the relay coil RC of the heating control device 96 and from leads 94 and 95 transmit a feedback signal to the winding 102; thus switch 100 closes providing an instantaneous increase in gate current which carries the load current past the firing point so as to prevent chattering of the relay. It is thus apparent that the circuitry of FIGURE 5 eliminates the need for the snap mechanisms in the thermostat.

Figure 6:
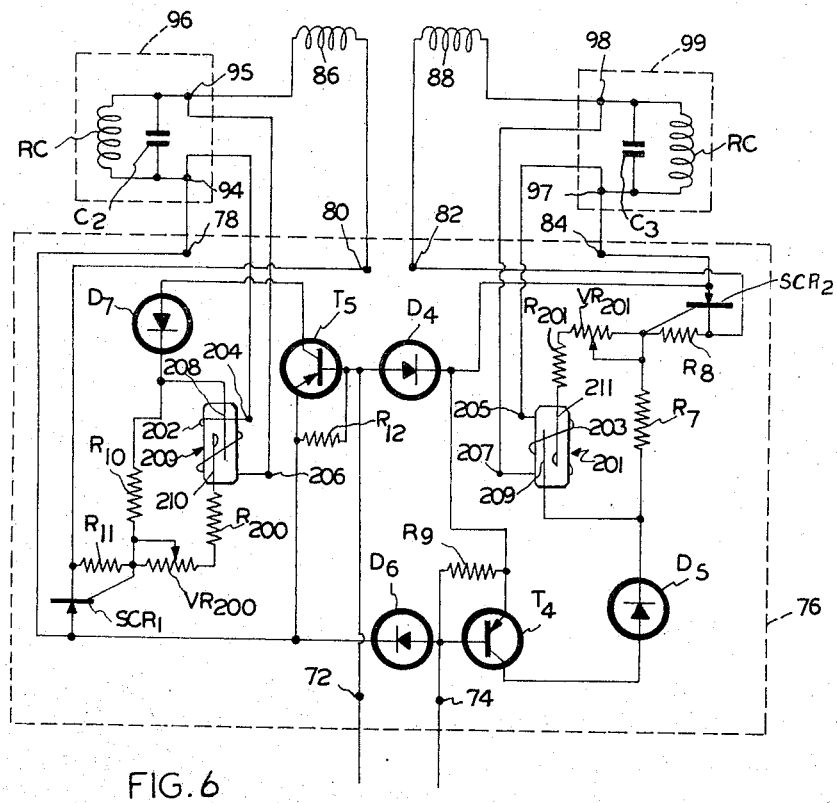
FIGURE 6 is a diagram of the electrical circuitry of a modified switching circuit device.

The arrangement of FIGURE 6 is similar to FIGURE 5 in operation but provides a modified switching circuit device 76 for inclusion with the circuitry of FIGURE 3. In this instance, a pair of magnetic reed type switches 200 and 201 have coiled windings 202 and 203, respectively, with the leads 204 and 206 for the winding 202 being connected to the relay coil leads 94 and 95, respectively, and with the leads 205 and 207 for the winding 203 being connected to the relay coil leads 97 and 98, respectively. Switch 200 has a contact terminal 208 connected to the conductor extending between diode D₇ and resistance R₁₀; similarly, switch 201 has a contact terminal 209 connected to the conductor extending between diode D₅ and resistance R₇. A second contact terminal 210 for switch 200 is connected to a fixed resistance R₂₀₀ which in turn is serially connected to one end of a variable resistance VR₂₀₀, the other end of which is connected to the gate or trigger electrode of the silicon controlled rectifier SCR₁. A second contact terminal 211 for switch 201 is connected to a fixed resistance R₂₀₁ which in turn is serially connected to one end of a variable resistance VR₂₀₁, the other end of which is connected to the gate or trigger electrode of the silicon controlled rectifier SCR₂.

With the arrangement of FIGURE 6, the magnetic reed switch circuits receive a feedback signal from their corresponding relay coils RC upon firing their respective silicon controlled rectifiers SCR₁ and SCR₂. The two magnetic reed switches operate as described above in connection with FIGURE 5, i.e., a feedback signal closes switch 200 (or 201) providing an instantaneous increase in the gate current of the silicon controlled rectifier SCR₁ (or SCR₂). The FIGURE 6 circuitry thus defines an alternate arrangement for eliminating the need of the snap mechanisms in the thermostat.

Inasmuch as the present invention is subject to many modifications, variations and changes in detail, it is intended that all matter contained in the foregoing description or shown on the accompanying drawing shall be interpreted as illustrative and not in a limiting sense.

What is claimed is:

1. In a thermostatic control system for combined heating and cooling systems, the combination comprising
   means establishing a pair of magnetic fields spaced from each other to define a null position therebetween,
   Hall plate means normally disposed in the null position between said magnetic fields,
   input current means for said Hall plate means,
   output voltage means for said Hall plate means,
   thermally responsive means operatively connected to said Hall plate means for moving the same from the null position into one magnetic field in response to heating demand and into the other magnetic field in response to cooling demand whereby said output voltage means present one phase signal for heating demand and another phase signal for cooling demand,
   heating and cooling control means including electric circuit means receiving the signals from said output voltage means and being separately operated thereby in accordance with the phase of each signal.

2. The combination as recited in claim 1 wherein the signals from said output voltage means vary in magnitude in accordance with temperature variations sensed by said thermally responsive means whereby said heating and cooling control means are provided with modulating operations.

3. The combination as recited in claim 1 wherein snap acting means operatively associated with said thermally responsive means effects snap movements for said Hall plate means and the signals from said output voltage means have a constant magnitude whereby said heating and cooling control means are provided with on-off operations.

4. The combination as recited in claim 3 wherein said thermaly responsive means comprises a bimetal element and wherein said snap acting means comprises adjustable permanent magnet means disposed adjacent said bimetal element.

5. The combination as recited in claim 1 wherein said electric circuit means includes amplifier means for amplifying the signals from said output voltage means, a switching circuit device connected to said amplifier means for receiving amplified signals therefrom and having a silicon controlled rectifier for each of said heating and cooling control means, and feedback circuit means connected to each of said heating and cooling control means whereby firing of one silicon controlled rectifier provides an instanteous increase in gate current thereof to assure snap action of the corresponding control means.

6. The combination as recited in claim 5 wherein said feedback circuit means comprises a pair of magnetic reed switches connected to said amplifier means.

7. The combination as recited in claim 5 wherein said feedback circuit means comprises a pair of magnetic reed switches connected to the silicon controlled rectifiers in said switching circuit device.

8. In a thermostatic control system for heating and cooling systems, the combination comprising
   heating control means and cooling control means,
   electric circiut means for separately operating said heating control means and said cooling control means in accordance with the phase of signals supplied thereto,
   Hall plate means having output voltage means electrically connected to said electric circuit means,
   input means for said Hall plate means supplying half wave current thereto,
   means establishing a pair of magnetic fields for said Hall plate means,
   thermally responsive means operatively connected to said Hall plate means for moving the same into one magnetic field in response to heating demand whereby said output voltage means presents one phase signal to said electric circuit means and for moving the same into the other magnetic field in response to cooling demand whereby said output voltage means presents another phase signal to said electric circuit means, and
   said pair of magnetic fields being spaced from each other to define a null position through which said Hall plate means is movable whereby the thermostatic control system automatically switches between the heating and cooling control means.

9. The combination as recited in claim 8 wherein said electric circuit means includes amplifier means receiving said signals, a switching circuit device receiving amplified signals from said amplifier means, and feedback circuit means connected to said heating and cooling control means for causing the same to operate with a snap action.

10. The combination as recited in claim 9 wherein said means establishing said pair of magnetic fields comprises a pair of spaced magnet means arranged with their like poles facing each other.

11. The combination as recited in claim 10 wherein said pair of spaced magnet means includes permanent magnets and wherein said permanent magnets are provided with adjustment means to vary the space between their like poles.

12. The combination as recited in claim 10 wherein said pair of spaced magnet means includes electromagnets and wherein winding coilings for said electromagnets are electrically connected to said input means for said Hall plate means.

13. The combination as recited in claim 12 wherein the winding coils of said electromagnetics are connected in series with said input means and wherein variable resistance means is connected across the winding coils of said electromagnets to permit selective adjustment between said magnetic fields and input current.

References Cited

UNITED STATES PATENTS

| | | | |
|---|---|---|---|
| 2,464,807 | 3/1949 | Hansen | 328—94 |
| 3,264,416 | 8/1966 | Jorden et al. | 324—45 |

ROBERT A. O'LEARY, *Primary Examiner.*

C. SUKALO, *Assistant Examiner.*